United States Patent Office 3,398,180
Patented Aug. 20, 1968

3,398,180
O-(2-PROPYNYL)-HYDROXAMIC ACIDS
Moses Wolf Goldberg, Upper Montclair, and Hanns Hanina Lehr, Montclair, N.J., and Marcel Muller, Reinach, Basel-Land, Switzerland, assignors to Hoffmann-La Roche Inc., Nutley, N.J., a corporation of New Jersey
No Drawing. Continuation-in-part of applications Ser. No. 831,941, Aug. 6, 1959, and Ser. No. 36,166, June 15, 1960. This application Aug. 21, 1963, Ser. No. 303,666
7 Claims. (Cl. 260—453)

ABSTRACT OF THE DISCLOSURE

O-(2-propynl)-hydroxamic acids which are utilized as flavoring agents for substances intended for oral injection and as intermediates for compounds having diuretic and/or naturetic properties.

---

This application is a continuation-in-part of applications Ser. No. 831,941, filed Aug. 6, 1959, now abandoned, and Ser. No. 36,166, filed June 15, 1960, now U.S. Patent 3,112,307.

This invention relates to a novel series of organic chemical compounds as well as novel intermediates therefor. More particularly, this invention relates to N-acylated propargyloxyamines. These compounds can be prepared by acylation of propargyloxyamine or a salt thereof. Thus, in one aspect, this invention relates to novel N-acylated propargyloxyamines of the formula

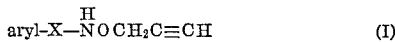

$$\text{aryl-X-}\overset{H}{N}\text{OCH}_2\text{C}\equiv\text{CH} \qquad (I)$$

wherein X is selected from the group consisting of carbonyl and sulfonyl.

The term aryl, as used above, comprehends both substituted and unsubstituted cyclic aromatic radicals such as phenyl, aminophenyl, halophenyl, nitrophenyl, acylaminophenyl and the like.

The compounds of Formula I above are useful as flavoring agents. They are particularly useful as flavoring agents in that they possess a garlic-like taste and impart this flavor when added to substances intended for oral ingestion.

The compounds of Formula I can be added to substances intended for ingestion, e.g. foodstuffs, in an amount sufficient to impart a garlic-like flavor in any conventional manner, for example they can be intermixed with solid materials or dissolved or suspended in liquid materials.

The compounds of Formula I can be formed by acylation of propargyloxyamine or a salt thereof. The acylation can be effected via use of any conventional acylating agent yielding the moiety aryl-X. Thus, for example, the acylating moiety can be an arylsulfohalide, for example benzenesulfonyl chloride or an aroyl halide or an aroyl anhydride. The starting material propargyloxyamine and its acid addition salts are novel compounds and are within the scope of the present invention. As well as possessing the utility outlined above, propargyloxyamine and its acid-addition salts are also useful as intermediates for compounds which are useful as therapeutic agents by virtue of their diuretic and/or naturetic properties. Said use of propargyloxyamine and its acid addition salts is described in copending application Ser. No. 36,166, filed June 15, 1960 and a parent application thereto, Ser. No. 831,941, filed Aug. 6, 1959 and now abandoned.

In addition to the above-described acylation process, certain compounds of Formula I can also be prepared via treatment of certain other compounds of Formula I. Thus, for example, compounds of Formula I wherein aryl is aminophenyl can be prepared via hydrolysis of compounds of Formula I wherein aryl is acylaminophenyl. Illustratively, $N^4$-lower alkanoyl-$N^1$-(2-propynyloxy)-sulfanilamides can be hydrolyzed to $N^1$-(2-propynyloxy)-sulfanilamide.

In a preferred aspect, the flavoring agents of this invention are selected from the group consisting of compounds of the formula

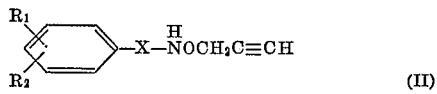

$$\begin{array}{c} R_1 \\ \diagup\!\!\diagdown \\ \diagdown\!\!\diagup \\ R_2 \end{array}\!\!-\!\!X\!-\!\overset{H}{N}\text{OCH}_2\text{C}\equiv\text{CH} \qquad (II)$$

wherein X is selected from the group consisting of carbonyl and sulfonyl, and each of $R_1$ and $R_2$ is selected from the group consisting of amino, acylamino, alkylamino, dialkylamino, alkyl, halo, nitro, alkylsulfonyl and hydrogen.

As used above, the term alkyl comprehends both straight and branched chain hydrocarbon groups, for example, lower alkyl such as, methyl, ethyl and the like. Similarly, the term acylamino comprehends acyl groups bearing straight and branched chain hydrocarbon groups, for example, lower alkanoyl such as acetyl and the like. Halo comprehends all four halogen atoms, i.e. bromine, chlorine, fluorine and iodine. In a preferred aspect of the invention $R_1$ and $R_2$ are each selected from the group consisting of amino, lower alkanolyamino, halo, hydrogen and nitro. Especially preferred are compounds of Formula I wherein the moiety denoted by aryl is selected from the group consisting of phenyl and phenyl bearing substituents selected from the group consisting of acetylamino, amino, chloro and nitro.

The following examples are illustrative, but not limitative of the invention. All temperatures are stated in ° C.

Example 1

400 g. of potassium hydroxylamine disulfonate was dissolved in 2.1 liters of water containing 125 g. potassium hydroxide. 268 g. of propargylbromide was dropped into this solution with stirring at room temperature. When all propargylbromide had been added, the mixture was heated to 60° C. for half an hour. It was then concentrated in vacuo almost to dryness. Two liters of 20 percent hydrochloric acid was added, and the solution heated on the steam bath for half an hour. It was then concentrated in vacuo to half of its original volume, and made alkaline by addition of 750 ml. 40 percent sodium hydroxide with stirring and outside cooling. The mixture was extracted four times with ether, and the combined ether extracts were dried with sodium sulfate. Hydrochloric acid gas was then bubbled through the ether solution. The precipitated O-propargyl hydroxylamine hydrochloride was filtered off and recrystallized from ethanol-ether. It melted at 162° with decomposition.

Example 2

11 g. of p-acetamino-benzenesulfonylchloride was added in portions with stirring and cooling, to a solution of 10 g. of propargyloxyamine hydrochloride in 100 ml. of pyridine. After the addition was completed, the mixture was stirred at room temperature for 16 hours, and then poured into 400 ml. of ice-cooled 3 N hydrochloric acid. After stirring for 2 hours, the solids were filtered off, washed with water and air-dried. Recrystallization from water yielded $N^4$-acetyl-$N^1$-(2-propynyloxy) sulfanilamide which melted at 163–165°.

Example 3

5 g. of $N^4$-acetyl-$N^1$-(2-propynyloxy)sulfanilamide was refluxed under stirring with 40 ml. of 3 N hydrochloric acid for 16 hours. After cooling, the solution was poured into ice-water, and the aqueous solution was concentrated in vacuo to about ⅓ its volume. The crystals were then filtered off, washed with water, and air-dried. Recrystallization from water yielded $N^1$-(2-propynyloxy)sulfanilamide which melted at 138–139°.

Example 4

To a solution of 3.5 g. of propargyloxyamine hydrochloride in 5 ml. of water there was added with cooling a solution of 3 g. of sodium carbonate in 12 ml. of water, followed by 3.5 g. of 2-chloro-4-nitrobenzoylchloride. The mixture was then stirred for 2 hours at room temperature, the solids were filtered off, washed with water and air-dried. Recrystallization from ethyl acetate-petroleum ether yielded 2-chloro-4-nitro-O-(2-propynyl)benzohydroxamic acid which melted at 140–142°.

Example 5

To a solution of 3.5 g. of propargyloxyamine hydrochloride in 5 ml. of water there was added with cooling a solution of 3 g. of sodium carbonate in 12 ml. of water, followed by 3.5 g. of 2-chloro-5-nitrobenzoylchloride. The mixture was stirred for 3 hours at room temperature, the solids were filtered off, washed with water, and air-dried. Recrystallization from ethyl acetate-petroleum ether yielded 2-chloro-5-nitro-O-(2-propynyl)benzohydroxamic acid which melted at 144–146°.

Example 6

0.3 g. of propargyloxyamine hydrochloride was dissolved in 3 ml. of water containing 0.26 g. of sodium carbonate. To this solution there was added 0.2 g. benzoyl chloride, and the mixture was stirred for 2 hours at room temperature. On chilling, crystals precipitated, which were filtered off, and air-dried. Recrystallization from ligroin (60–90°) yielded O-(2-propynyl)benzohydroxamic acid in the form of white needles melting at 86–88°.

We claim:
1. A compound having the formula:

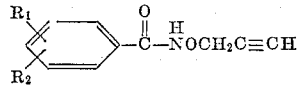

wherein $R_1$ and $R_2$ are amino, halo, nitro, acetylamino, or hydrogen.

2. A compound of the formula

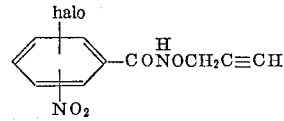

3. O-(2-propynyl)-acetylamino-benzohydroxamic acid.
4. O-(2-propynyl)-aminobenzohydroxamic acid.
5. O-(2-propynyl)-benzohydroxamic acid.
6. 2 - chloro - 4 - nitro - O - (2 - propynyl) - benzohydroxamic acid.
7. 2 - chloro - 5 - nitro - O - (2 - propynyl) - benzohydroxamic acid.

References Cited
UNITED STATES PATENTS 3,052,706   9/1962   Goldberg et al. _____ 260—453
3,352,899   11/1967  Taniguchi et al. _____ 260—453

JOSEPH P. BRUST, *Primary Examiner.*